United States Patent [19]
Smaller
[11] 3,725,611
[45] Apr. 3, 1973

[54] DOUBLE COATED STORAGE MEDIUM FOR CONTACT TRANSFER RECORDING

[76] Inventor: Philip Smaller, 4155 Wilkie, Palo Alto, Calif. 94306

[22] Filed: Sept. 30, 1971

[21] Appl. No.: 185,136

[52] U.S. Cl. ........................179/100.2 A, 179/100.2 E
[51] Int. Cl. ..............................G11b 5/70, G11b 5/86
[58] Field of Search .....179/100.2, 100.2 A, 100.2 E; 346/74 MT

[56] References Cited

UNITED STATES PATENTS

| | | | |
|---|---|---|---|
| 3,052,567 | 9/1962 | Gabor | 179/100.2 A |
| 2,647,954 | 8/1953 | Howell | 179/100.2 A |
| 3,364,496 | 1/1968 | Greiner | 179/100.2 E |
| 3,465,105 | 9/1969 | Kumada | 179/100.2 E |
| 3,641,280 | 2/1972 | Browder | 179/100.2 E |
| 3,185,775 | 5/1965 | Camras | 179/100.2 A |

*Primary Examiner*—Bernard Konick
*Assistant Examiner*—Jay P. Lucas
*Attorney*—Charles M. Hogan et al.

[57] ABSTRACT

A double coated magnetic tape has a relatively thin ferromagnetic layer for storing short wavelength signals and a thicker ferromagnetic layer spaced from the first layer by an intermediate nonmagnetic base for storing long wavelength signals. The thickness of the base and the ferromagnetic layers are selected so that short wavelength signals are efficiently transferred by the thin layer and long wavelength signals are efficiently transferred by the thick layer, the intermediate wavelength harmonics of the long wavelength signals being attenuated by the spacing of the thick layer from a copy tape adjacent the thin layer to which the information is to be transferred.

4 Claims, 2 Drawing Figures

INVENTOR.
PHILIP SMALLER
BY Charles M. Hogan
Gary M. Gron
ATTORNEYS.

DOUBLE COATED STORAGE MEDIUM FOR CONTACT TRANSFER RECORDING

The present invention relates to magnetic storage mediums and particularly to the contact transfer of magnetic signals from such storage mediums.

In recent years direct contact transfer recording has been developed to enable high speed transformation of magnetic signals from a master to a copy tape. This method involves bringing a copy tape into intimate contact with the master tape and at the same time increasing the sensitivity of the copy tape to the magnetic signals on the master tape. When the tapes are separated the magnetic signals on the master tape are magnetically impressed on the copy tape.

There are several methods to increase the sensitivity of the copy tape, the first of which is a thermomagnetic technique. The copy tape is comprised of a low Curie point material that is heated to a paramagnetic state prior to contact with the master tape. When it comes in contact with the master tape the copy tape is easily magnetized by the magnetic force of the signals on the master tape. As the copy tape cools and returns to a ferromagnetic state, the hysteresis loops expand and the magnetization intensity increases. When the copy tape is separated from the master tape a strong magnetic signal remains on the copy tape.

The second approach to contact transfer recording is the use of a magnetic bias on the copy tape during the period of contact. This method requires that the master tape have a higher coercivity than the copy tape to prevent the magnetic bias from erasing the signals on the master tape.

Both of these methods have a common problem. It has been found that with contact recording both the short and the long wavelength signals are less efficiently transferred than the intermediate wavelength signals. This problem is exaggerated in a thermal transfer because the transfer efficiencies of the medium wavelength signals are greater than unity.

In addition, there exists a problem of harmonic distortion. This arises when the master tape is recorded to a high level of magnetization and harmonic distortion signals are generated. For example, when the fundamental is a low frequency the harmonics are at intermediate wavelengths and hence will be transferred more efficiently than the fundamental. This greatly increases the distortion of the signal transferred to the copy tape.

Therefore it is an object of the present invention to effectively transfer all wavelengths with comparable efficiency from a master to a copy storage medium thereby minimizing the enhancement of harmonic distortion components of the signals.

These ends are achieved by a magnetic storage medium which comprises first and second ferromagnetic layers lying along opposite faces of a nonmagnetic base. The first and second layers have predetermined thickness for respectively storing short and long wavelength signals. The base has a given thickness to maintain the second layer at a predetermined distance from the outer surface of the first layer. This attenuates medium wavelength signals and particularly harmonic distortion components of the long wavelength signals when the signals are transferred to a copy storage medium adjacent the outer surface of the first layer.

The above and other related objects and features of the present invention will be apparent from a reading of the description of the disclosure shown in the accompanying drawing and the novelty thereof pointed out in the appended claims.

Figures 1, 2:
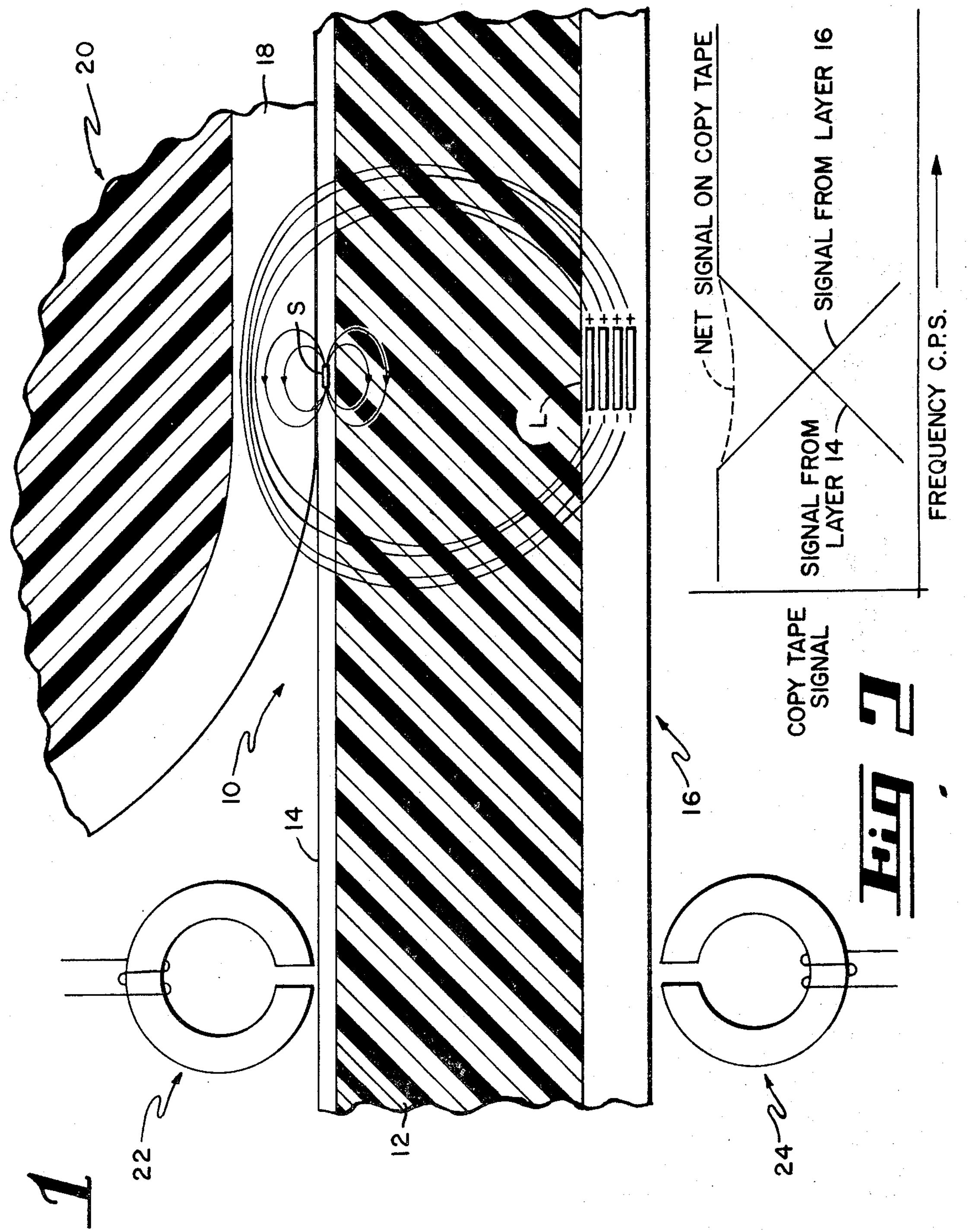
FIG. 1 is a greatly enlarged sectional view of a master magnetic tape embodying the present invention along with a copy tape to which signals on the master tape are to be transferred.
FIG. 2 is a graph showing the relationship of the copy tape signal and the frequency of signals stored on the master tape of FIG. 1.

Referring particularly to FIG. 1 there is shown a master magnetic storage medium generally indicated by reference character 10. As herein shown, the magnetic storage medium is illustrated in the form of a flexible tape. However, it should be apparent to those skilled in the art that the storage medium may take other forms, such as a drum, endless belt, disk and the like with equal effectiveness.

The master tape comprises a nonmagnetic flexible base 12, a first relatively thin ferromagnetic layer 14 and a second relatively thicker ferromagnetic layer 16.

The nonmagnetic material 12 may be any one of a number of nonmagnetic polyester films frequently used for magnetic tape purposes. As discussed in detail later, ferromagnetic layer 14 has a predetermined thickness suitable for primarily storing short wavelength magnetic signals. Layer 16 has a predetermined thickness suitable for primarily storing long wavelength signals. In addition, base 12 has a given thickness so that medium wavelength signals and particularly harmonic distortion components of long wavelength signals on the layer 16 will be attenuated when the signals are transferred to a ferromagnetic layer 18 of a copy tape 20 brought into intimate contact with the outer surface of layer 14.

Magnetic signals are recorded on layers 14 and 16 by first and second magnetic heads 22 and 24, respectively, through suitable electronic circuits well known to those skilled in the art (not shown for clarity). Head 22 primarily records short wavelength signals and head 24 primarily records long wavelength signals. Alternatively, head 22 alone can be used with some slight reduction in the strength of the recorded signal on layer 16.

The operation of the master tape 10 is as follows: The information to be recorded on the layers 14 and 16 of the master tape is applied to magnetic heads 22 and 24. The stored information subsequently is transferred to the copy tape 20 by intimate contact transfer techniques. For a discrete magnetic dipole S on layer 14, the magnetic fields extend for a relatively short distance and because of the close proximity of layers 14 and 18 there is a high efficiency in the transfer of the short wavelength magnetic signals from the layer 14 to the ferromagnetic layer 18 of the copy tape. At the same time a discrete magnetic dipole L, shown on layer 16, has a magnetic field that extends well into the ferromagnetic layer 18 of the copy tape 20. The field emanating from dipole L extends to layer 18 because the length of L is greater than the length of S. Although the layer 16 is spaced from layer 18 by base 12, the thickness of layer 16 causes the magnetic fields from subsequent dipoles (L), to accumulate and enhance the magnetic field impressed on layer 18 of copy tape 20. The consequence of this is that the field acting on 18 is proportional to the thickness of 16. At the same time, however, the medium wavelength harmonic distortion components of the long wavelength signals found in layer 16 are attenuated by the spacing of the layer 16 from the layer 18. The reason for this is that the magnetizing force is greatly decreased when the distance from the origin of the force to the element being magnetized approaches and exceeds the wavelength of the signal. The exact mathematical expression for the field H acting at a distance *d* away from a magnetized dipole is given by $$H = Ke^{-2\pi \frac{d}{\lambda}}$$

where:

$H$ is the magnetic force
$\lambda$ is the equivalent wavelength of the dipole
$K$ is a constant
$e$ is natural logarithim base (2.718)
$d$ is the distance from the dipole A good approximation is that the wavelength is twice the dipole length. The distance between the layer 16 and the layer 18 is selected so that the medium wavelength signals are greatly attenuated but the long wavelength signals are not.

This is illustrated in FIG. 2 which shows the copy tape signal as a function of frequency. The signal from the layer 16 shows a significant reduction in amplitude for increasing frequency or the shorter wavelength signals. At the same time a signal from the layer 14 shows a significant reduction for decreasing frequency or the longer wavelength signals. The net signal on the copy tape is a combination of the signals from layers 14 and 16 so that there is only a slight attenuation of the basic middle frequency or medium wavelength signals. However, the harmonic distortion components of the long wavelength signals found on the layer 16 are greatly attenuated by the spacing of the layer 16 from the layer 18.

While the precise dimensions of the components of the master tape 10 can be determined by those skilled in the art using the principles set forth above, it has been found that the following dimensions give highly acceptable results:

| | |
|---|---|
| Layer **14** | 0.05 mils |
| Base **12** | 1.50 mils |
| Layer **16** | 0.40 mils |

The above double-coated master storage medium provides a highly efficient transfer of the entire wavelength range using magnetic direct transfer techniques and particularly for thermomagnetic transfer techniques. To enable the efficient transfer of a wide range of signal wavelengths with this approach a high magnetization level of the master tape is required. When the master tape is recorded at a high level of magnetization the extremely high transfer efficiently to the copy tape while in its paramagnetic state causes high distortion of the signal, particularly in the middle wavelength range. This results because the copy tape is easily saturated. With the double-coated magnetic storage medium layers 14 and 16 can be recorded to a high level of magnetization without the risk of saturating the copy in the case of thermomagnetic transfer. Since the signal-to-noise ratio to the master is high, the signal-to-noise ratio of the copy tape is also high. The use of recording heads to place a signal on the master tape 10 has been illustrated. However, other methods, such as thermomagnetic or magnetic transfer techniques, can be used by an appropriate selection of materials with equally advantageous results.

While the preferred embodiment of the present invention has been illustrated, it should be apparent to those skilled in the art that the invention may be utilized in other forms without departing from the spirit and scope thereof.

Having thus described the invention, what is claimed as novel and desired to be secured by Letters Patent of the United States is:

1. A master magnetic storage medium for the direct contact transfer of signals to a copy storage medium, said master magnetic storage medium comprising:

a nonmagnetic base layer;

first and second ferromagnetic layers lying along opposite faces of said base layer, said first ferromagnetic layer having a predetermined thickness for storing primarily short wavelength signals and said second ferromagnetic layer having a predetermined thickness for storing primarily long wavelength signals;

said base layer having a given thickness substantially greater than the thickness of either ferromagnetic layer to maintain said second ferromagnetic layer at a predetermined distance from the outer surface of said first ferromagnetic layer for attenuating medium wavelength signals and particularly medium wavelength harmonic distortion components of said long wavelength signals on the second layer when the signals are transferred from said second magnetizable layer to said copy magnetic storage medium adjacent the outer surface of said first ferromagnetic layer.

2. A magnetic storage medium as in claim 1 wherein said first layer is relatively thin and said second layer is relatively thicker.

3. A magnetic storage medium as in claim 1 wherein said nonmagnetic base layer is an elongated flexible material.

4. A magnetic storage medium as in claim 1 wherein:

said first layer has a thickness of approximately 0.05 mils;

said base has a thickness of approximately 1.50 mils; and said second layer has a thickness of approximately 0.40 mils.

* * * * *